(12) United States Patent
Ukita

(10) Patent No.: US 7,716,870 B2
(45) Date of Patent: May 18, 2010

(54) SPINNER FOR FISHING LURE AND WITH THE SPINNER ROTATABLY MOUNTED THEREON

(76) Inventor: Russell Tadao Ukita, 1402 Stratford Ave., South Pasadena, CA (US) 91030

( * ) Notice: Subject to any disclaimer, the term of this patent is extended or adjusted under 35 U.S.C. 154(b) by 0 days.

(21) Appl. No.: 11/251,267

(22) Filed: Oct. 14, 2005

(65) Prior Publication Data
US 2006/0086034 A1    Apr. 27, 2006

Related U.S. Application Data

(60) Provisional application No. 60/621,593, filed on Oct. 25, 2004.

(51) Int. Cl.
*A01K 85/12* (2006.01)
(52) U.S. Cl. ............... 43/42.19; 43/42.14; 43/42.15
(58) Field of Classification Search ........... 43/42.06, 43/42.09, 42.11, 42.13, 42.14, 42.15, 42.16, 43/42.17, 42.18, 42.19, 42.2, 42.21
See application file for complete search history.

(56) References Cited

U.S. PATENT DOCUMENTS

| | | | | |
|---|---|---|---|---|
| 667,257 | A | * | 2/1901 | Shakespeare et al. ...... 43/42.14 |
| 671,613 | A | * | 4/1901 | Shakespeare et al. ...... 43/42.14 |
| 1,503,901 | A | * | 8/1924 | Jones, Jr. ............... 43/42.14 |
| 1,842,127 | A | * | 1/1932 | Stickel et. al. ........... 43/42.12 |
| 2,229,239 | A | * | 1/1941 | Davis .................... 43/42.06 |
| 2,722,079 | A | * | 11/1955 | Johnson ................. 43/42.14 |
| 2,846,805 | A | * | 8/1958 | Waitzman ............... 43/42.06 |
| 2,926,451 | A | * | 3/1960 | Leba .................... 43/42.14 |
| 3,397,478 | A | * | 8/1968 | Lowes, Jr. .............. 43/42.14 |
| 3,405,474 | A | * | 10/1968 | Lewis ................... 43/26.2 |
| 3,650,062 | A | * | 3/1972 | Troyer .................. 43/42.06 |
| 3,766,682 | A | * | 10/1973 | Majdak .................. 43/42.14 |
| 4,037,346 | A | * | 7/1977 | Holst .................... 43/42.14 |
| 4,110,930 | A | * | 9/1978 | Daniels ................. 43/42.14 |
| D257,382 | S | * | 10/1980 | Williams, Jr. ............ D22/129 |
| 4,382,345 | A | * | 5/1983 | Bassett .................. 43/42.17 |
| 4,447,980 | A | * | 5/1984 | Bassett .................. 43/42.14 |
| 5,321,905 | A | * | 6/1994 | Higgins .................. 43/42.03 |
| 5,327,670 | A | * | 7/1994 | Tallerico ................ 43/42.14 |
| 5,412,900 | A | * | 5/1995 | Rosek ................... 43/42.19 |

FOREIGN PATENT DOCUMENTS

| | | | |
|---|---|---|---|
| FR | 2766056 | * | 1/1999 |
| JP | 8-140531 | * | 6/1996 |
| WO | WO 03/059056 | * | 7/2003 |

* cited by examiner

*Primary Examiner*—David J Parsley

(57) ABSTRACT

A fishing lure having: (a) a shaft with rearward end and forward end; (b) a rear loop at rearward end of the shaft; (c) a hook affixed to rear loop; (d) a weighted body on shaft next to rear loop; (e) a bearing bead rotatably mounted on shaft next to weighted body; (f) a spinner rotatably mounted on shaft next to bearing bead, the spinner being a predetermined cut length of tubular material having a longitudinal center line axis, tubular material having angled cut ends with planar surfaces, tubular material having two apertures through which the shaft projects; the two apertures being through the surface of the tubular material between angled cut ends and aligned at an angle to the longitudinal center line axis, the shaft traversing the cross section of the tubular material; and (g) a front loop to attach a fishing line at forward end of the shaft.

9 Claims, 1 Drawing Sheet

SPINNER FOR FISHING LURE AND WITH THE SPINNER ROTATABLY MOUNTED THEREON

CROSS-REFERENCE TO RELATED APPLICATIONS

This application claims the benefits of the filing date of my U.S. Provisional Patent Application Ser. No. 60/621,593 filed Oct. 25, 2004, entitled "Spinner for fishing lure and with the spinner rotatably mounted thereon". In addition, at least a portion of the subject matter of the invention has been previously disclosed in U.S. PTO Disclosure Document No. 561556 filed Sep. 29, 2004.

STATEMENT REGARDING FEDERALLY SPONSORED RESEARCH OR DEVELOPMENT

Not Applicable

SEQUENCE LISTING OR PROGRAM

Not Applicable

BACKGROUND OF THE INVENTION

1. Field of Invention

This invention relates to artificial fishing lures, and more particularly refers to a fishing lure having a spinner.

2. Description of Prior Art

Fishing lures having a spinner rotatably mounted on the lure shaft have been in existence for well over a hundred years. The rotation of a spinner around the axis of a lure creates certain actions in the lure as it travels through the water. These actions can attract fish to strike at the lure. Flashing, spinning, vibrating, fluttering, and wobbling are desirable actions associated with spinner type fishing lures. When in use, lures having one or more spinners might, at the most, accomplish three to four of the identified actions at one time. The most common and popular spinner has been one with an elliptical outline having a dished cross-section similar in shape to a spoon. This spinner, often identified as a spinner blade, is generally provided with an aperture at one end. Through the aperture, a clevis is attached to the spinner. The spinner is mounted on a shaft by means of the clevis allowing them to rotate around the lure's shaft. Another form of spinner has somewhat of a symmetrical shape with dual blades diametrically opposed to each other. Such dual-bladed spinners are often identified as propeller blade spinners. A dual-bladed spinner has a central pivoting location, and at this location, an aperture in the spinner allows the spinner to be rotatably mounted on a shaft. The central line of the dual-bladed spinner is commonly shown to be perpendicular to the lure shaft. A dual-bladed spinner can be rotatably mounted at an inclination to the shaft; however, this would require a bearing member having an elongated aperture to be fixed to the spinner blade. The configuration and orientation of the spinner's blade when the lure passes through water causes rotation of the spinner around the shaft. U.S. Pat. No. 3,397,478 to Lowes (1968) and U.S. Pat. No. 3,533,182 to Turbeville (1970) have, in association with their inventions, dual-bladed spinners similar in appearance to a propeller. U.S. Pat. No. 4,447,980 to Bassett (1984) and U.S. patent application. Ser. No. 20010047608 from Cox (2001) depict more recent adaptations of dual-bladed spinners.

U.S. Pat. No. 4,447,980 to Bassett (1984) and U.S. patent application Ser. No. 20010047608 from Cox (2001) depict more recent fishing lures having their adaptations of dual-bladed spinners.

To make most all currently manufactured spinner blades, including Bassett's and Cox's preferred material for their dual-bladed spinners, sheet metal material is used. The basic spinner outline is die-cut from the sheet metal, and then, the spinner's final configuration is achieved by forming or bending the cut spinner piece. Sheet metal material is used because the metal material is able to conform and stay in the desired formed or bent shape.

The dual-bladed spinner for the fishing lure associated with U.S. Pat. No. 4,447,980 requires a fabricated bearing member having an elongated aperture affixed into an opening at the center of the spinner. The shaft of the fishing lure passes through the aperture of the bearing member. This bearing member is needed during rotation of the spinner to maintain a desired inclined angle of the dual-bladed spinner's central line to the longitudinal axis of the lure shaft.

U.S. patent application Ser. No. 20010047608 is limited to a lure having only one dual-bladed spinner, which means that a multi-directional fluttering action cannot be developed.

3. References Cited

| U.S. Pat. No. 3,397,478 | August, 1968 | Lowes | 43/42.14 |
|---|---|---|---|
| U.S. Pat. No. 3,533,182 | October, 1970 | Turbeville | 43/42.14 |
| U.S. Pat. No. 4,447,980 | May, 1984 | Bassett | 43/42.14 |
| U.S. Patent Appl. No. 20010047608 | December, 2001 | Cox | 43/42.19 |

4. Objects and Advantages of the Invention

It is, accordingly, an object of the present invention to provide a fishing lure which will attract game fish and to overcome the disadvantages of the prior art.

It is an object of the present invention to provide a fishing lure which when in use has all the desirable actions of spinning, flashing, vibrating, fluttering, and wobbling generated at one time to be attractive to game fish.

It is an object of the present invention to provide a fishing lure with a spinner that is unusually different in appearance and in use of material than has been made available to fishermen.

It is an objective of the present invention to provide a fishing lure having an unusually different spinner(s) of the type described which can be simply and inexpensively manufactured from readily available materials.

It is a further objective of the present invention to provide a fishing lure with its unusually different spinner(s) that can be manufactured in very small to large sizes for use in attracting various sizes of freshwater and saltwater game fish.

In the development of the preferred embodiments of the present invention, all the above identified objects have been met. In meeting these objects the advantages of the present invention is established. They are described under "DETAILED DESCRIPTION OF THE INVENTION."

BRIEF SUMMARY OF THE INVENTION

It is, accordingly, a key objective of the present invention to provide a fishing lure with a spinner, or spinners, that accomplishes all the desirable actions such as spinning, flashing, fluttering, vibrating and wobbling to entice game fish to strike the lure as it moves through the water. The spinner of the present invention is functionally similar to a dual-bladed spinner. The present invention provides a fishing lure with a spinner, or spinners, that avoids the disadvantages of the prior art.

The fishing lure of the present invention has a spinner, or spinners, unusually different in appearance and in the use of readily available materials, can be simply and inexpensively manufactured, and that has not been made available to fishermen until now.

Figure 1:
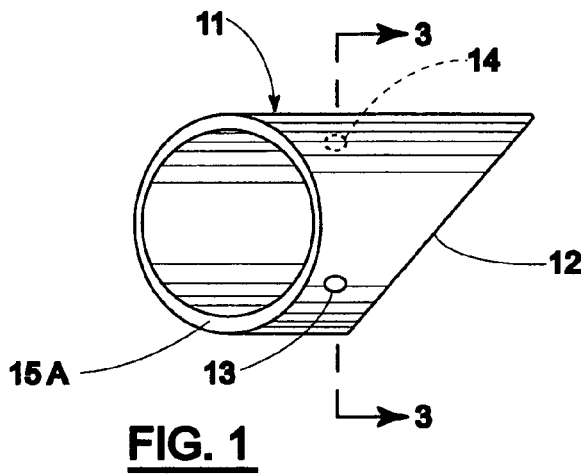
FIG. 1—is a view of the fishing lure spinner, looking directly down upon a horizontal plane, where on the right end of the spinner the true angle of the angled cut end is shown.

1. Reference Numerals in Drawing and Figures
11 Spinner made of tubular material
12 Angled cut end of spinner
12A Planar surface
13 Aperture through the spinner surface
14 Aperture through the spinner surface
15 Angled cut end of spinner
15A Planar surface
16 Spinner made preferably of the same diameter size tubular material and in a slightly longer cut length than spinner 11, spinner 16 made mirror image from FIGS. 1, 2, 3, and 4, and rotates in opposite direction than spinner 11.
17A Additional bearing bead between spinners
17B Bearing bead between spinner and weighted body
18 Weighted body
19 Hook
20 Shaft
20A Front loop at forward end of shaft
20B Rear loop at rearward end of shaft

DETAILED DESCRIPTION OF THE INVENTION

1. Description of FIGS. 1, 2, 3, 4, 5, and Preferred Embodiments of the Spinners and Fishing Lure Referring to FIGS. 1, 2, 3, and 4, a predetermined length of tubular material having angled cut ends 12 and 15 is shown fabricated into spinner 11 of the present invention. The spinner can preferably be made of non-corrosive metal tubes or tubes made of more flexible synthetic plastic compounds. The preferred wall thicknesses for spinners made from non-corrosive metal tubes is between about 0.014 to 0.040 inches thick, although other metal tubes wall thicknesses could be used.

Referring to FIG. 1, this view of spinner 11 is looking directly down upon a horizontal plane. In this view the true angle of the angled cut end 12 is at the right end of spinner 11. The outer perimeter of angled cut end 12 is slightly rounded to eliminate sharp edges.

Figure 2:
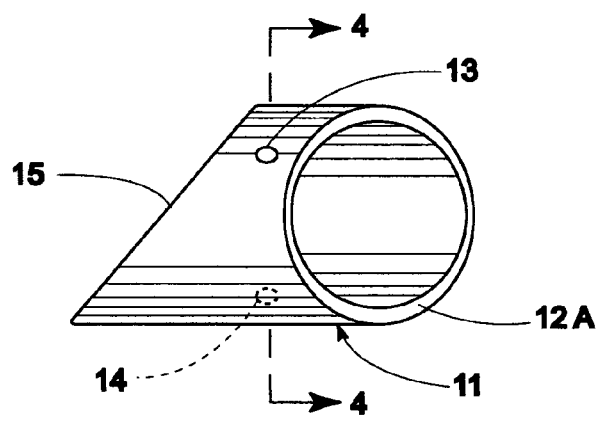
FIG. 2—is a view of the spinner shown in FIG. 1 showing the left end of the spinner where the true angle of the angled cut end is shown. This view results from the spinner in FIG. 1 being rotated, with the right hand, 90 degrees clockwise around the spinner's longitudinal center line axis.

Referring to FIG. 2, a different view of spinner 11 is made looking directly down upon a horizontal plane. This view of spinner 11 is made after the spinner, as viewed in FIG. 1, has been rotated, with the right hand, 90 degrees clockwise around its longitudinal center line axis. The view in FIG. 2 shows the true angle of the angled cut end 15 on the left end of spinner 11. The outer perimeter of angled cut end 15 is slightly rounded to eliminate sharp edges.

Referring to FIGS. 1 and 2, the planar surfaces 12A and 15A of angled cut ends 12 and 15, in relation to the longitudinal center line axis of spinner 11, are in rotated positions about 90 degrees from each other.

Referring to FIGS. 1 and 2, in relation to the spinner's longitudinal center line axis, angled cut ends 12 and 15 are made at about the same chosen acute angle within the approximate range of 45 to 60 degrees. The specifically chosen degree of acute angle for angled cut ends 12 and 15 influences the overall length and rotational speed of the spinner.

Referring to FIGS. 1, 2, 3, and 4, two apertures 13 and 14 are made through the surface material of spinner 11 between angled cut ends 12 and 15.

Referring to FIGS. 1 and 2, the alignment of two apertures 13 and 14 is located at about the middle of the length of spinner 11, and the alignment is about perpendicular to the longitudinal center line axis of spinner 11.

Figure 3:
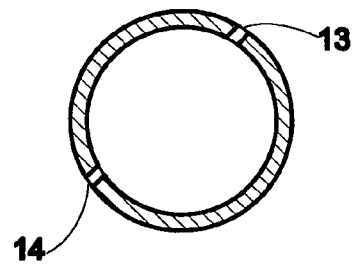
FIG. 3—is a sectional view of the spinner in the direction indicated by section line 3 in FIG. 1 and where the angle for the alignment of the two apertures is at about 45 degrees to a horizontal line for FIG. 3.
Figure 4:
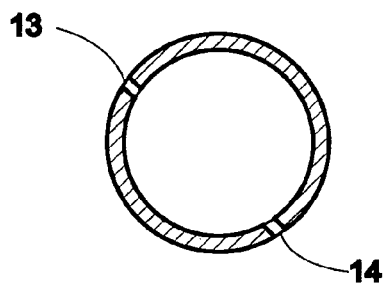
FIG. 4—is a sectional view of the spinner in the direction indicated by section line 4 in FIG. 2 and where the angle for the alignment of the two apertures is at about 45 degrees to a horizontal center line for FIG. 4.

Referring to FIGS. 3 and 4, the angle of the alignment for two apertures 13 and 14 is at about 45 degrees to a horizontal line for these two figures.

Referring to FIGS. 3 and 4, the alignment of two apertures 13 and 14 traverses through the cross section of spinner 11; however, does not pass through the center of the cross section of spinner 11. An unbalanced rotation of the spinner's mass around shaft 20, which is made of rigid stainless steel wire and passes through spinner 11 apertures, is caused by the alignment being at a predetermined offset distance from the center of the spinner's cross section per FIGS. 3 and 4. This unbalanced spinner mass rotation creates an intensified vibrating action and a wobbling action to the fishing lure FIG. 5 when in use. Note, however, that the chosen offset distance for the alignment cannot be too far from the center of the spinner's cross section as this could significantly impede the rotation of the spinner around the axis of the lure shaft. The limiting offset distance is not to be any greater than about ⅓ of the radius distance from the center of the spinner's cross section to the inner circumference of the tubular spinner.

Figure 5:
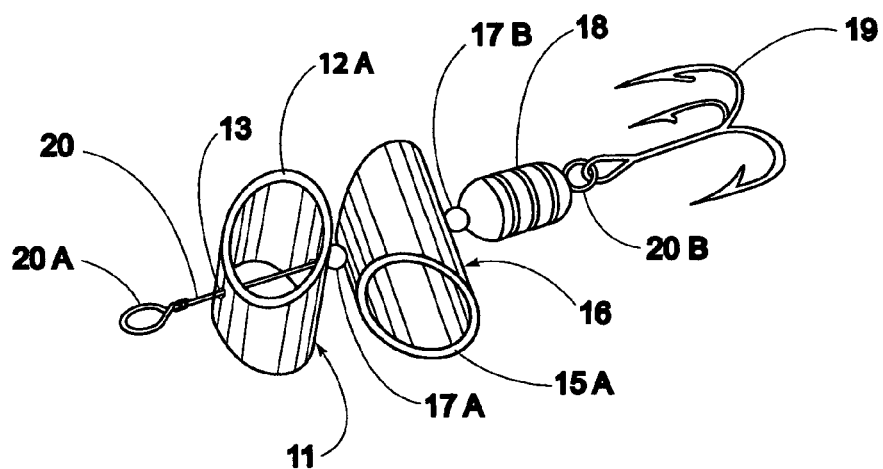
FIG. 5—is a perspective view of a completely assembled fishing lure.

Referring to FIG. 5, all the preferred embodiments of the fully assembled fishing lure are identified.

Referring to FIG. 5, rear loop 20B is made at the rearward end of shaft 20 and provides an end element to secure all mounted elements to the shaft and provides a feature where a hook 19 is affixed to the loop.

Referring to FIG. 5, weighted body 18 having an aperture is mounted on the rearward end of shaft 20. Weighted body 18 having a mass chosen to serve as a weight to allow the fishing lure to be cast out appreciable distances and to keep the fishing lure FIG. 5 submerged in the water while in use.

Referring to FIG. 5, bearing bead 17B, having an aperture, is rotatably mounted on shaft 20. Bearing bead 17B establishes a small rounded-surface bearing contact area enabling easy rotation of adjacent spinner 16.

Referring to FIG. 5, spinner 16 is rotatably mounted on shaft 20 adjacent to bearing bead 17B. Spinner 16 is made mirror image from spinner 11 as shown in FIGS. 1, 2, 3, and 4. The outer perimeter of angled cut ends 12 and 15 are slightly rounded to eliminate sharp edges. Fabrication of spinner 16 per mirror image of FIGS. 1, 2, 3, and 4 results in spinner 16 being able to rotate in an opposite direction from spinner 11 when the fishing lure is in use. When seen directly from the forward end of shaft 20, oblique views of planar surfaces 12A and 15A of angled cut ends 12 and 15 of spinner 16's angled cut ends would appear to be about equal in size and shape. It is a preference to make spinner 16 of tubular material the same diameter and slightly longer in length than spinner 11.

Referring to FIG. 5, additional bearing bead 17A having an aperture is rotatably mounted on shaft 20. Additional bearing bead 17A provides small bearing contact areas enabling easy rotations of spinner 16 and spinner 11.

Referring to FIG. 5, spinner 11 is rotatably mounted on shaft 20 adjacent to additional bearing bead 17A. Spinner 11 is made per FIGS. 1, 2, 3, and 4. Spinner 11 is rotatably mounted on shaft 20. When seen directly from the forward end of shaft 20, oblique views of planar surfaces 12A and 15A of spinner 11's angled cut ends would appear to be about equal in size and shape. The spinner rotates in the opposite direction of spinner 16 when the fishing lure is in use. The rotation of spinners 11 and 16 moving in opposite directions from each other creates a distinctive multi-directional fluttering action when the lure travels through the water.

Referring to FIG. 5, front loop 20A is made at the forward end of shaft 20. Front loop 20A provides an end element to secure all the mounted lure elements to shaft 20 and, also, provides an element for the attachment of a fishing line to the fishing lure.

While a particular preferred example of the present invention has been shown and described, it is apparent that various changes, modifications, and supplemental inclusions may be made without departing from the invention in its broadest aspects.

2. Advantages

From the description above, a number of advantages of the spinner and fishing lure of the present invention become evident:

(a) The spinners can be made from readily available tubular materials and only requires two angled cut ends to create the spinner's overall shape.
(b) There is no need for any forming or bending of material to accomplish the final overall shape and configuration of the spinners. The effort to fabricate a spinner is a very simple and inexpensive process and the spinner need not be made from only metal materials. The spinner of the present invention can also made of more flexible synthetic plastic compounds. When cut into smaller ring-like sections, tubular sections made of the more flexible synthetic plastic compounds are still able to conform and stay in their overall cylindrical configuration. A wider selection of available materials for fabrication of the spinners of the present invention would be more attractive to manufacturing interests to produce the fishing lure of the present invention.
(c) The spinners do not require any other element such as a clevis or an affixed bearing member to be rotatably mounted on a lure shaft. For the spinner of the present invention, only two drilled apertures are needed to rotatably mount the spinner on the lure shaft.
(d) The spinner will have an unbalanced mass rotation around the lure shaft, due to the spinner's aperture alignment being offset from the center of the spinner's cross section. The unbalanced spinner rotation results in a desirable wobbling action and vibrating action which are essential actions that contribute to the overall favorable undulation action of the fishing lure.
(e) The fishing lure having two spinners spinning in opposite directions results in a multi-directional fluttering, multiple wobbling, and multiple vibrating actions that together further enhance the overall undulating action of the fishing lure. The overall undulating action of the fishing lure having two spinners rotating in opposite directions closely simulates the movements of a live bait fish.

3. Operation

A fisherman casts the fishing lure FIG. 5 out into the water containing game fish. The lure's spinners 11 and 16 will slowly rotate in opposite directions as it initially sinks into the water's depth. This rotation of spinners 11 and 16 would be an attractive motion to game fish. A vast majority of past and currently available fishing lures do not have an attractive motion when first sinking into the water prior to lure retrieval. They just proverbially sink like a lead weight until retrieved by the fisherman. When the fisherman starts to retrieve the lure of the present invention, FIG. 5, spinners 11 and 16 immediately reverse their rotational movements and increase or decrease their rotational movements depending on how fast or slow the lure is retrieved. When the fishing lure is pulled through the water, the forces toward and against spinners 11's and 16's angled cut ends 12 and 15 cause the spinners to rotate around shaft 20. The rotational movements of the spinners create multiple fluttering and flashing actions to the lure where the flashing action is primarily dependent upon the final finish of the spinners' surfaces. The apertures for spinners 11 and 16 have their alignments at predetermined offset distances from the spinners' cross sectional centers. These offset alignments create the condition for unbalanced mass rotation of the spinners around shaft 20. The unbalanced mass rotations of the spinners induce multiple vibrating action as well as multiple wobbling action to the lure. The combination of the spinner's fluttering action, multiple vibrating action, multiple wobbling action, and multiple spinning action creates in the lure an overall undulating movement simulating a live bait fish in motion. The vast majority of fishing lures having spinners, never achieve such an overall undulating live bait fish motion. Spinners 11 and 16 are made of tubular material and can have shiny, polished metal, or coated finished surfaces that reflect light when the spinners rotate in the water; and this would result in substantial flashing action when using the fishing lure.

4. Conclusions, Ramifications, and Scope

The fishing lure of the present invention has an unusually contrived, simply made spinner fabricated from tubular material that requires no forming or bending, as required by most all currently manufactured bladed spinners, to create the final overall configuration of the spinner.

Most all spinner blades and dual-bladed spinners are fabricated from metal materials. The fishing lure of the present invention can have metal spinners and also spinners made from more flexible synthetic plastic materials.

The fishing lure of the present invention has no requirement for a clevis or a bearing member having an elongated aperture to be attached to the spinner, in order for the spinner to be rotatably mounted onto the fishing lure shaft. Many of the elliptical spinners currently available to fishermen require a clevis to be rotatably mounted onto the shaft of a fishing lure. The bladed spinner associated with U.S. Pat. No. 4,447,980 requires a bearing member having an elongated aperture to be attached to the spinner to create a stabilized angular mounting to the fishing lure shaft.

The fishing lure of the present invention with two spinners, as in the preferred embodiments, have the alignment of their apertures at predetermined offset distances from the cross-sectional centers of the spinners. The offset alignments create a condition for unbalanced mass rotations as the spinners rotate around the lure shaft. When in use, the unbalanced rotations of the spinners result in a wobbling action being imparted to the fishing lure.

The fishing lure of the present invention can have one, two, or more spinners rotatably mounted onto the lure's shaft. A one spinner lure could not achieve a multi-directional fluttering action, but could achieve all other actions to a lesser degree than a lure with multiple spinners. Two or more spinners rotating in opposite directions from each other would create a unique multi-directional fluttering action for the lure during use and enhance the lure's flashing, vibrating, spinning, and wobbling actions. With all the actions developed in the preferred embodiments of the present invention, an overall undulating action similar to a live bait fish traveling through the water is simulated and is thus attractive to game fish.

The fishing lure of the present invention, in the preferred embodiment, has spinners that rotate slowly when the lure first hits the water and then starts to sink before lure retrieval. As the lure initially sinks into the water, the slow rotation of the spinners would attract game fish to strike the lure. Most all available fishing lures with spinners do not have any uniform spinner rotation when sinking into the water's depth before lure retrieval.

While preferred embodiments of the invention have been shown and described, various other adjustments, changes, modifications, and supplemental inclusions can be made without departing from the invention in its broadest scope. The following are some examples of such changes, modifications, and supplemental inclusions:

(a) A fishing lure could be made to conform to mirror images of FIGS. 1, 2, 3, 4, and 5. This would result in such a fishing lure, when in use, to have its spinners 11 and 16 rotating in reverse directions from the fishing lure of the present invention made in actual conformance to FIGS. 1, 2, 3, 4, and 5. Both fishing lures would have the same overall performance and actions when in use.

(b) The fishing lure of the present invention can have supplemental solid metal beads, hollow metal beads, or plastic beads rotatably mounted onto the lure shaft. These beads to be located within the cavities of the spinners rotatably mounted on the lure shaft. Such supplemental beads would provide various benefits for the fishing lure such as increased casting distance, increased color enhancement, and use of the beads as sound enhancement features. Such benefits would potentially increase the capability of the lure to catch fish and potentially entice more fishermen to purchase the lure. The use of supplemental enhancement beads on the lure would increase the cost to make the lure.

(c) The fishing lure of the present invention can have colorful round or elliptical shaped buoyant high-density polystyrene micro-floats rotatably mounted onto the lure shaft. These micro-floats would be located within the cavities of the spinners rotatably mounted on the lure shaft. The supplemental micro-floats would enable the lure to sink into the water at a slower rate than lures not having the micro-floats, which might be an advantage for certain fishing conditions. The micro-floats would develop buoyancy-related action to the lure where some added motions to the lure would result especially during stop and go retrieval of the lure during use, and would be a color enhancement item for the lure as well. The use of supplemental micro-floats on the lure would increase the cost to make the lure.

(d) The fishing lure of the present invention can have two shafts linked together, in place of just one shaft, where each shaft has a rotatably mounted single spinner and bearing bead next to the spinner. This would result in an articulated lure. An articulated fishing lure would likely have some increased potential for the development of wobbling and undulating actions. Having an articulated lure would increase the cost of making the lure. It can be considered for future modifications to the lure.

The fishing lure of the present invention has an efficient spinner made from tubular materials. The spinner shape and configuration may be considered for use in other applications besides a fishing lure.

Invention is claimed as follows:

1. A fishing lure comprising:
(a) a shaft having a rearward end and a forward end;
(b) a rear loop provided at the rearward end of said shaft;
(c) a hook affixed to said rear loop;
(d) a weighted body disposed upon the rearward end of said shaft next to said rear loop;
(e) a bearing bead rotatably mounted on said shaft and disposed next to said weighted body;
(f) a tubular spinner rotatably mounted on said shaft and disposed next to said bearing bead, said tubular spinner comprising a predetermined cut length of tubular material having a longitudinal center line axis, said tubular material having angled cut ends with planar surfaces, said angled cut ends being at acute angles in relation to said longitudinal center line axis of said tubular material, said tubular material having an inner circumference, said tubular material having two apertures through which said shaft projects, said two apertures being through the surface of said tubular material between said angled cut ends and aligned at an angle to said longitudinal center line axis, the alignment of said two apertures is such that oblique views of said planar surfaces are directly seen from the forward end of said shaft, said shaft traversing the cross section of said tubular material; and
(g) a front loop to attach a fishing line provided at said forward end of said shaft.

2. A fishing lure according to claim 1 wherein said tubular material comprises a material selected from the group consisting of non-corrosive metals and synthetic plastic compounds.

3. A fishing lure according to claim 1 wherein said angled cut ends have acute angles between the range of about 45 to about 60 degrees in relation to the longitudinal center line axis of said tubular material.

4. A fishing lure according to claim 1 wherein the alignment of said two apertures is located at about the mid-length of said tubular material, alignment being at about a 90 degree angle to the longitudinal center line axis of said tubular material, alignment traverses through the cross section of said tubular material.

5. A fishing lure according to claim 4 wherein alignment of said two apertures is located at a predetermined offset distance from the center point of a cross section of said tubular material thereby resulting in unbalanced mass rotation and spinning actions of said tubular spinner when rotatably mounted on said shaft.

6. A fishing lure according to claim 1 wherein said planar surfaces are obliquely seen as being about equal in size and shape when said tubular spinner, rotatably mounted on said shaft, is viewed directly from said forward end of said shaft.

7. A fishing lure according to claim 1 wherein said shaft has a pair of tubular spinners rotatably mounted thereon and said tubular spinners are rotatable in predetermined directions.

8. A fishing lure according to claim 7 wherein said shaft has an additional bearing bead rotatably mounted on said shaft to separate said tubular spinners, thereby the rounded surface of said additional bearing bead creates a condition for easy rotation of the tubular spinners on said shaft.

9. A fishing lure according to claim 1 wherein said tubular material comprises a metal tube having a wall thickness between about 0.014 inch and about 0.040 inch.

\* \* \* \* \*